·

US008169773B2

(12) United States Patent
Lee et al.

(10) Patent No.: US 8,169,773 B2
(45) Date of Patent: May 1, 2012

(54) ELECTROCHEMICAL CAPACITOR (75) Inventors: Sang Kyun Lee, Gyeonggi-do (KR); Bae Kyun Kim, Gyeonggi-do (KR); Jung Eun Noh, Gyeonggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 0 days.

(21) Appl. No.: 12/905,509

(22) Filed: Oct. 15, 2010

(65) Prior Publication Data
US 2011/0317331 A1     Dec. 29, 2011

(30) Foreign Application Priority Data

Jun. 23, 2010   (KR) ........................ 10-2010-0059578

(51) Int. Cl.
*H01G 9/00* (2006.01)
(52) U.S. Cl. ........ 361/502; 361/503; 361/504; 361/509; 361/512; 361/517
(58) Field of Classification Search .................. 361/502, 361/503–504, 509, 512, 516–519, 523–525, 361/528–530, 540–541; 29/25.01, 25.03
See application file for complete search history.

(56) References Cited

U.S. PATENT DOCUMENTS

| | | | | |
|---|---|---|---|---|
| 5,162,166 A | * | 11/1992 | Ellgen | 429/524 |
| 5,549,989 A | * | 8/1996 | Anani | 429/306 |
| 6,143,440 A | * | 11/2000 | Volz et al. | 429/92 |
| 6,413,664 B1 | * | 7/2002 | Wilkinson et al. | 429/457 |
| 6,521,368 B2 | * | 2/2003 | Okazaki | 429/434 |
| 7,541,111 B2 | * | 6/2009 | Itoh et al. | 429/175 |
| 2009/0244810 A1 | * | 10/2009 | Reynolds | 361/500 |

FOREIGN PATENT DOCUMENTS

| | | |
|---|---|---|
| JP | 2004-356461 | 12/2004 |
| JP | 2010-135361 | 6/2010 |
| KR | 10-2005-0002755 A | 1/2005 |
| KR | 10 2006-0008102 A | 1/2006 |
| KR | 10 0881854 B1 | 1/2009 |

OTHER PUBLICATIONS

Korean Office Action issued in Korean Patent Application No. 10-2010-0059578 dated Dec. 19, 2011.

* cited by examiner

*Primary Examiner* — Nguyen T Ha
(74) *Attorney, Agent, or Firm* — McDermott Will & Emery LLP (57) ABSTRACT

The present invention provides an electrochemical capacitor, which includes: a cell electrode unit which includes cathodes, anodes, and separators interposed between the cathodes and the anodes which are alternately stacked in multiple layers; cathode terminals which are extended to one side of each of the cathodes and are stacked one above another; anode terminals which are extended to one side of each of the anodes and are stacked one above another with a separation space from the cathode terminals; a housing for receiving the cell electrode unit, the cathode terminals, and the anode terminals; and an output terminal unit which is insert-molded to penetrate from the inside to the outside of the housing, electrically connected to at least one of each of the stacked cathode and anode terminals, and immobilizes the cell electrode unit into the housing.

10 Claims, 6 Drawing Sheets

ELECTROCHEMICAL CAPACITOR

CROSS-REFERENCE TO RELATED APPLICATIONS

This application claims the benefit of Korean Patent Application No. 10-2010-0059578 filed with the Korea Intellectual Property Office on Jun. 23, 2010, the disclosure of which is incorporated herein by reference.

BACKGROUND OF THE INVENTION

1. Field of the Invention

The present invention relates to an electrochemical capacitor; and, more particularly, to an electrochemical capacitor having an output terminal unit which is inject-molded in such a manner to be provided within a housing.

2. Description of the Related Art

An electrochemical energy storage apparatus refers to a system for storing energy by using an electrochemical principle. Such an electrochemical energy storage apparatus has been used as a core component of finished products in various appliances such as portable information communication appliances, and electron appliances.

The electrochemical energy storage apparatus may include a lithium secondary battery and an electrochemical capacitor. Herein, when compared to the lithium secondary battery, the electrochemical capacitor has a high energy density and a high capacitance, so it is expected to be used as an innovative energy source in a new and renewable energy field applicable to the future electric vehicles and portable electron devices.

The electrochemical capacitor may be manufactured in a winding type and a pouch type. The electrochemical capacitor of the pouch type may be manufactured to have a less weight at a cheaper cost over that of the winding type.

The electrochemical capacitor of the pouch type is manufactured by the following processes, including a laminate process, a bonding process, and a sealing process. In the laminate process, a cell electrode unit is formed by successively stacking cathodes, separation films, and anodes in a sheet type. In the bonding process, a terminal unit is formed by performing bonding of respective cathode and anode terminals. In the sealing process, the formed cell electrode unit is sealed.

Herein, the bonding process refers to a process for bonding each of the cathode and anode terminals stacked in multiple layers. The bonding process may be performed by such a fusion process as ultrasonic fusion, and laser melting. The terminal unit manufactured in this way is integrally fused, so it is possible to implement easy connection of external terminals used for voltage applying.

However, there has been a problem in that the terminals are torn out due to physical force or resistance of the electrochemical capacitor is increased due to poor fusion of the terminals.

SUMMARY OF THE INVENTION

The present invention has been proposed in order to overcome the above-described problems and it is, therefore, an object of the present invention to provide an electrochemical capacitor, which is provided with an output terminal unit insert-molded in a housing, thereby directly bonding each of the stacked terminals to the output terminal unit even without a fusion process, which possibly causes an increase in the resistance.

In accordance with one aspect of the present invention to achieve the object, there is provided an electrochemical capacitor including: a cell electrode unit which includes cathodes, anodes, and separators interposed between the cathodes and the anodes which are alternately stacked in multiple layers; cathode terminals which are extended to one side of each of the cathodes and are stacked one above another; anode terminals which are extended to one side of each of the anodes and are stacked one above another with a separation space from the cathode terminals; a housing for receiving the cell electrode unit, the cathode terminals, and the anode terminals; and an output terminal unit which is insert-molded to penetrate from the inside to the outside of the housing, electrically connected to at least one of each of the stacked cathode and anode terminals, and immobilizes the cell electrode unit into the housing.

Also, the output terminal unit includes: external contact parts which are disposed on external surfaces of the housing; insertion parts which are extended from the external contact parts and inserted into the housing; and internal contact parts which are extended from the insertion parts and are in contact with each of the stacked terminals.

Also, each of the internal contact parts electrically connects ends of the stacked terminals facing ends of the cathodes, or ends of the anodes.

Also, each of the internal contact parts electrically connects side ends of the stacked terminals connected to the ends of the cathodes, or the ends of the anodes.

Also, each of the terminals includes insertion holes through which the internal contact parts are inserted to interconnect the stacked terminals.

Also, the external contact parts are disposed on at least one of bottom and side surfaces of the housing.

Also, the output terminal unit further comprises fixing parts which are extended from the internal contact parts, and are bent to immobilize the cell electrode unit in the housing.

Also, each of the fixing parts is bent to cover the uppermost anode terminal of the stacked anode terminals, or the uppermost cathode terminal of the cathode terminals.

Also, each of the terminals is extended in a horizontal direction to the cathodes, or to the anodes.

Also, the electrochemical capacitor further includes reinforcing members interposed between respective stacked terminals.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERABLE EMBODIMENTS

Embodiments of an electrochemical capacitor in accordance with the present invention will be described in detail with reference to the accompanying drawings. When describing them with reference to the drawings, the same or corresponding component is represented by the same reference numeral and repeated description thereof will be omitted.

The size, thickness, and shapes of lenses may be exaggerated in the drawings of embodiments for clarity. In particular, shapes of aspherical/spherical surfaces in the lenses are merely presented as one example, and the present invention is not limited to these shapes.

Figure 1:
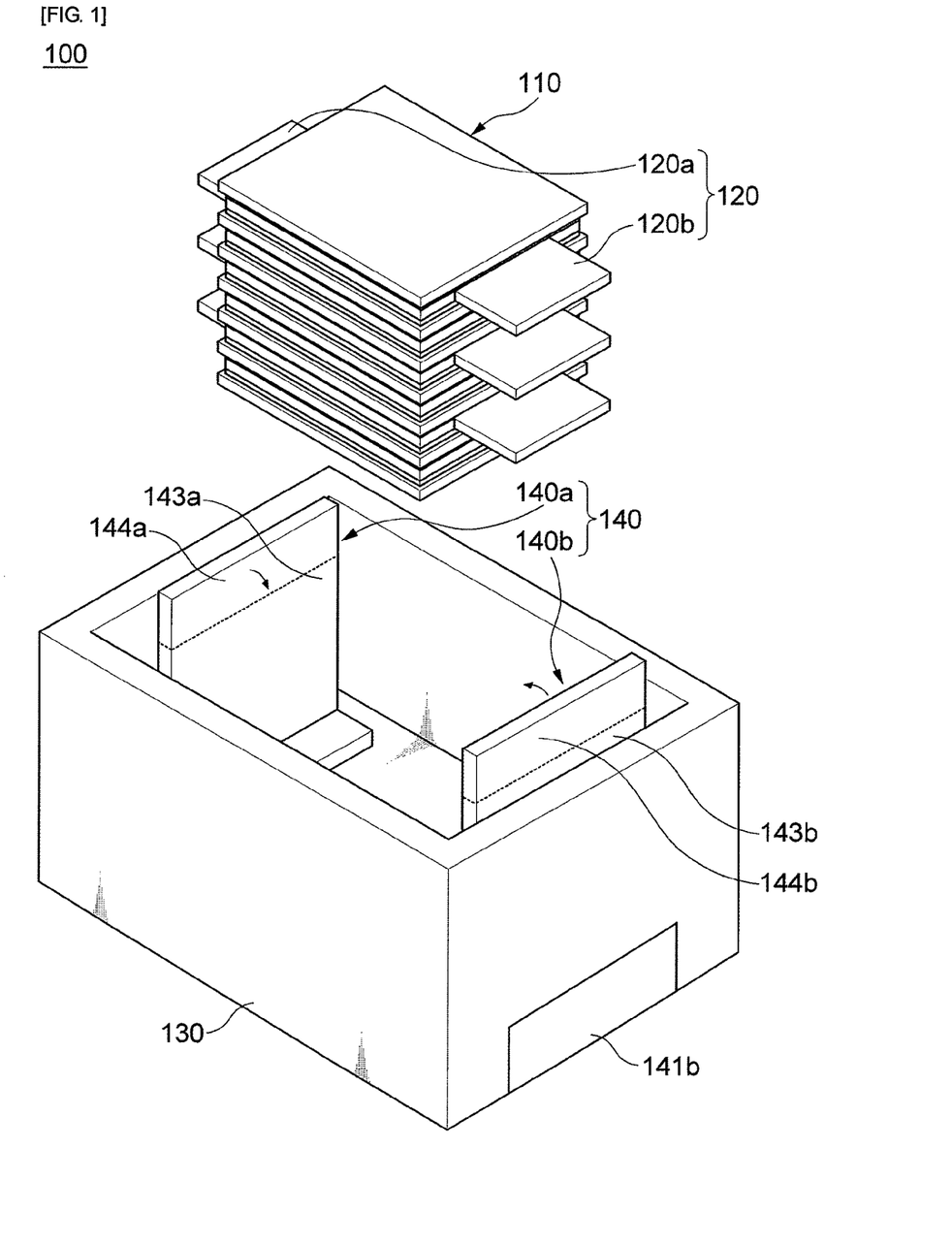
FIG. 1 is an exploded perspective view of an electrochemical capacitor in accordance with a first embodiment of the present invention.

FIG. 1 is an exploded perspective view of an electrochemical capacitor in accordance with a first embodiment of the present invention.

Figure 2:
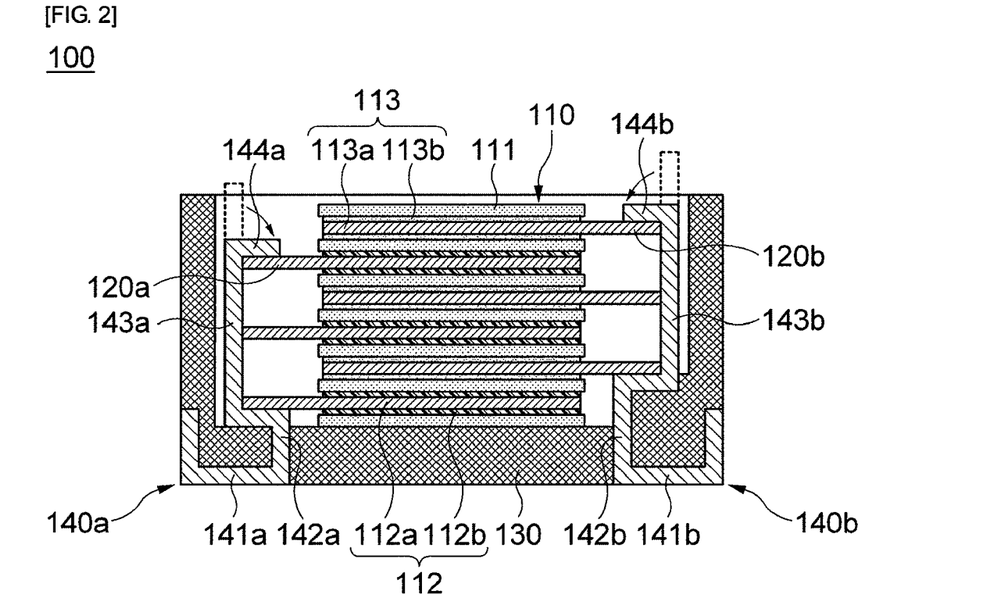
FIG. 2 is a cross-sectional view of the electrochemical capacitor shown in FIG. 1.

FIG. 2 is a cross-sectional view of the electrochemical capacitor shown in FIG. 1.

Referring to FIGS. 1 and 2, the electrochemical capacitor 100 in accordance with the embodiment of the present invention may include a cell electrode unit 110, terminals 120, a housing 130, and an output terminal unit 140.

The cell electrode unit 110 may include cathodes 112, anodes 113, separators 111 interposed between the cathodes 112 and the anodes 113 which are alternately stacked with respect to the separators 111.

Herein, the cathodes 112 may include cathode current collectors 112a, and cathode active material layers 112b coated on both sides of each of the cathode current collectors 112a, respectively. Herein, each of the cathode current collectors 112a may be formed of metallic material, for example, aluminum (Al). Each of the cathode current collectors 112a may include a plurality of through holes for transferring ions. Also, each of the cathode active material layers 112b may include activated carbon.

Also, anodes 113 may include anode current collectors 113a, and anode active material layers 113b coated on both sides of each of the anode current collectors 113a, respectively. Herein, each of the anode active material layers 113b may be formed of at least one of metallic materials (e.g., Cu, and Ni). Each of the anode current collectors 113a may include a plurality of through holes for transferring ions. Also, each of the anode active material layers 113b may include any one of activated carbon and graphite.

Also, each of the separators 111 may be made of insulating material which has durability against either electrolyte solution or active material. Also, the separators 111 may be porous to transfer ions. As for material of the separators 111, cellulose, polyethylene, polypropylene, and so on may be exemplified.

In the embodiments of the present invention, materials and shapes of the cathodes 112 and the anodes 113 may depend on types of the electrochemical capacitor, and the present invention is not limited thereto.

Also, it has been illustrated that the cell electrode unit 110 includes cathodes and anodes of three layers, which is provided for illustrative purpose. However, the present invention is not limited thereto. The number of cathodes and anodes to be stacked may be varied depending on characteristics of capacitors required for the electrochemical capacitor.

The terminals 120 may be extended from one side of each of the cathodes 112 and the anodes 113 in the opposite direction, and may be stacked one above another. Herein, the terminals 120 may include cathode terminals 120a and anode terminals 120b. The cathode terminals 120a are extended from the cathode current collectors 112a of the stacked cathodes 112, respectively, and the anode terminals 120b are extended from the anode current collectors 113a of the stacked anodes 113, respectively.

The cathode terminals 120a and the anode terminals 120b may be spaced apart from each other, and may be connected to the cell electrode unit 110. For example, the cathode terminals 120a and the anode terminals 120b may be disposed on both ends of the cell electrode unit 110, respectively. Herein, the cathode terminals 120a may be extended in a horizontal direction to the cathodes 112. Thus, the cathode terminals 120a may be vertically stacked in such a manner to be spaced apart from one another. That is, the stacked cathode terminals 120a may be spaced apart from one another. Additionally, the anode terminals 120b may be extended in a horizontal direction to the anodes 113. Thus, the anode terminals 120b may be vertically stacked in such a manner to be spaced apart from one another. That is, the stacked anode terminals 120b may be spaced apart from one another.

The housing 130 may receive the cell electrode unit 110 and the terminals 120. In addition to this, the electrolyte solution may be filled into the inner space of the housing 130 having the cell electrode unit 110. In this case, the separators 111, the cathodes 112, and the anodes 113 may be immersed in the electrolyte solution. Herein, the electrolyte solution may play a role of a medium for transfer ions, and may be formed of material which generates no electrolysis at a high voltage and keeps ions unchanged. Herein, the electrolyte solution may include electrolyte, and solvent. The electrolyte, existing as solution of salt, may include lithium salt, ammonium salt, or so on. As for the solvent, Propylene carbonate, Diethyl carbonate, Ethylene carbonate, sulfolane, Acetonitrile, Dimethoxyethane, tetrahydrofuran, and so on may be exemplified. Herein, the solvent may be composed of one compound or mixture of two or more compounds. However, materials of the electrolyte solution are not limited by the embodiment of the present invention.

The housing 130 may be formed of resin suitable for injection-molding, for example, epoxy-based resin, liquid polymer, amide-based resin, acryl-based resin, urethane-based resin, and phenol-based resin. Herein, the housing 130 may be made using one resin or mixture of two or more resins. However, materials of the housing 130 are not limited by the embodiment of the present invention.

The output terminal unit 140 is inject-molded in such a manner to penetrate from the inside to the outside of the housing 130. That is, the output terminal unit 140 may be integrally formed in the housing 130. Herein, the output terminal unit 140 may play a role of electrically interconnecting the terminals 120 of the cell electrode unit 110 to an external power source. Additionally, the output terminal unit 140 may play a role of immobilize the cell electrode unit 110 into the housing 130. Also, the output terminal unit 140 may play a role of a guide during a laminate process of forming the cell electrode unit 110 in the housing 130. That is, the cathodes 112, the separators 111, and the anodes 113 may be sequentially stacked along the output terminal unit 140 provided within the housing, even without a separate align process.

The output terminal unit 140 may include a first output terminal unit 140a connected to the respective cathode terminals 120a, and a second output terminal unit 140b connected to the respective anode terminals 120b. Herein, in case where the cathode terminals 120a and the anode terminals 120b are disposed on each of right and left sides of the housing 130 in such a manner so that the cathode and anode terminals can face each other, the first output terminal unit 140a and the second output terminal unit 140b may be disposed on each of right and left sides of the housing 130.

Herein, the first output terminal unit 140a may include a first external contact part 141a, a first insertion part 142a, and a first internal contact part 143a, all of which are integrally connected to one another.

Since the first external contact part 141a may play a role of a terminal used for connection to the external power source, it may be disposed on an external side of the housing 130. Herein, the first external contact part 141a may be partially disposed on a bottom surface of the housing 130, and may be partially disposed on a side surface bent to a bottom surface of the housing 130. However, the location of the first external contact part 141a is not limited thereto. For example, the first external contact part 141a may be disposed on a part of the bottom surface of the housing 130, or on a part of the side surface of the housing 130.

The first insertion part 142a may be extended in such a manner to penetrate from the first external contact part 141a in an upward direction with respect to the bottom surface of the housing 130 to thereby be inserted into the body of the housing 130. Thus, the first output terminal unit 140a may be coupled to the housing 130.

The first internal contact part 143a may extend upwardly from the first insertion part 142a to be in contact with the cathode terminals 120a. Herein, ends of the cathode terminals may be stacked along the first internal contact part 143a, respectively. In this case, ends of the cathode terminals 120a may face ends of the cathodes 112. Thus, the first internal contact part 143a may be in electrically contact with the stacked cathode terminals 120a. That is, the first internal contact part 143a integrally connected to the first external contact part 141a may be bonded to each of the stacked cathode terminals 120a which are spaced apart from one another without their fusion. Therefore, the electrochemical capacitor according to the embodiment of the present invention can require no bonding of the cathode terminals 120a through a fusion process which has been performed for connection to the external power source.

Also, the cathodes 112 can be stacked one above another by taking the first internal contact part 143a as a guide, so that it is possible to sequentially stack the cathodes 112 on a regular basis without a separate align process.

The first output terminal unit 140a can restrict movement of the cell electrode unit 110 to at least one side. That is, the first output terminal unit 140a can immobilize the cell electrode unit 110 in the housing 130.

However, the first output terminal unit 140a can limit no upward and downward movement of the cell electrode unit 110. Thus, the first output terminal unit 140a may further include a first fixing part 144a. Herein, the first fixing part 144a may extend in a horizontal direction to the first internal contact part 143a. In this case, the cell electrode unit 110 formed by sequentially stacking the cathodes 112, the separators 111, and the anodes 113 may be inserted into the housing 130, and then the first fixing part 144a may be bent to cover the top surface of the cell electrode unit 110. In this case, the first fixing part 144a may be bent to cover the top surface of the cell electrode unit 110, that is, the uppermost cathode terminal of the cathode terminals 120a, so that the first fixing part 144a can immobilize the cell electrode unit 110 within the inside of the housing 130. That is, the first fixing part 144a may prevent the cell electrode unit 110 of the housing 130 from being moved.

Thus, the first output terminal unit 140a insert-molded in the housing 130 is electrically interconnected to each of the stacked cathode terminals 120a to thereby be in electrical connect with the outside, and to immobilize the cell electrode unit 110 in the housing 130.

The second output terminal unit 140b may have the same technical construction as that of the above-mentioned first output terminal unit 140a, except that the second output terminal unit 140b functions to electrically interconnect the stacked anode terminals 120b. That is, the second output terminal unit 140b may include a second external contact part 141b, a second insertion part 142b, a second internal contact part 143b, a second fixing part 144b, each of which corresponds to the first external contact part 141a, the first insertion part 142a, the first internal contact part 143a, and the first fixing part 144a of the first output terminal unit 140a. Thus, description will be merely given of technical construction for the second output terminal unit 140b differentiated from the first output terminal unit 140a, and the repeated description thereof will be omitted.

The second output terminal unit 140b may include the second external contact part 141b, the second insertion part 142b, the second internal contact part 143b, and the second fixing part 144b, all of which are integrally interconnected to one another. Herein, ends of the anode terminals 120b facing the ends of the anodes 113 may be stacked one above another along the second internal contact part 143b. That is, the second internal contact part 143b may be electrically connected to each of the anode terminals 120b. The second internal contact part 143b integrally connected to the second external contact part 141b may be bonded to the anode terminals 120b which are stacked to be spaced apart from one another without their fusion. Therefore, the electrochemical capacitor in accordance with the embodiments of the present invention requires no bonding of the anode terminals 120b through a fusion process which has been performed for connection to terminals of an external power source.

The second fixing part 144b is extended from the second internal contact part 143b, and is bent to cover the top surface of the cell electrode unit 110. In this case, the second fixing part 144b is disposed to cover the top surface of the cell electrode unit 110, that is, the uppermost one of the anode terminals 120b. The second fixing part 144b may immobilize the cell electrode unit 110 in the housing 130, together with the first fixing part 144a.

Thus, the second output terminal unit 140b insert-molded in the housing 130 is electrically connected to the respective stacked anode terminals 120b to thereby provide electrical connection to the outside. Also, the second output terminal unit 140b may fix the cell electrode unit 110 at the housing 130 not to be moved.

In addition, the housing 130 may further include a protrusion 131 protruding from a partial portion of the right-side bottom surface of the housing 130 so as to compensate a step of a lower part of the second output terminal unit 140b. Herein, the location where the protrusion 131 is to be placed may be changed according to a sequential order where components of the cell electrode unit 110 are stacked. In case where the anodes 113 are first disposed on the bottom surface of the housing 130, the protrusion 131 may be formed on a partial portion of the left-side bottom surface of the housing 130, so as to compensate the step of the lower part of the first output terminal unit 140a.

In the embodiment of the present invention, the output terminal unit 140 is provided with the first output terminal unit 140a, and the second output terminal unit 140b, but the present invention is not limited thereto. For example, the output terminal unit 140 may be connected to any one of the cathode terminals 120a and the anode terminals 120b. That is, only one output terminal unit may be provided in the electrochemical capacitor 100.

In addition, although not shown in the drawings, a cover member may be further disposed which covers an opening surface of the housing 130. Thus, the cell electrode unit 110 within the housing 130 may be sealed to be protected from the outside.

Therefore, as in the embodiment of the present invention, the electrochemical capacitor is provided with the output terminal unit 140 insert-molded in the housing, by which terminals stacked one above another are electrically interconnected to one another, so that it is possible to reduce the number of processes and the rate of process's defects because of no requirement of a separate fusion process.

Also, the electrochemical capacitor of the embodiment of the present invention requires no fusion process, so it is possible to perform a laminate process of the cathodes, separators, and anodes within the housing even without a separate align process. As a result, the electrochemical capacitor of the present invention results in an increase in mass-production.

Also, in the electrochemical capacitor of the present invention, the output terminal unit 140 can immobilize the cell electrode units at the housing, so that it is possible to ensure durability against the external shock.

Figure 3:
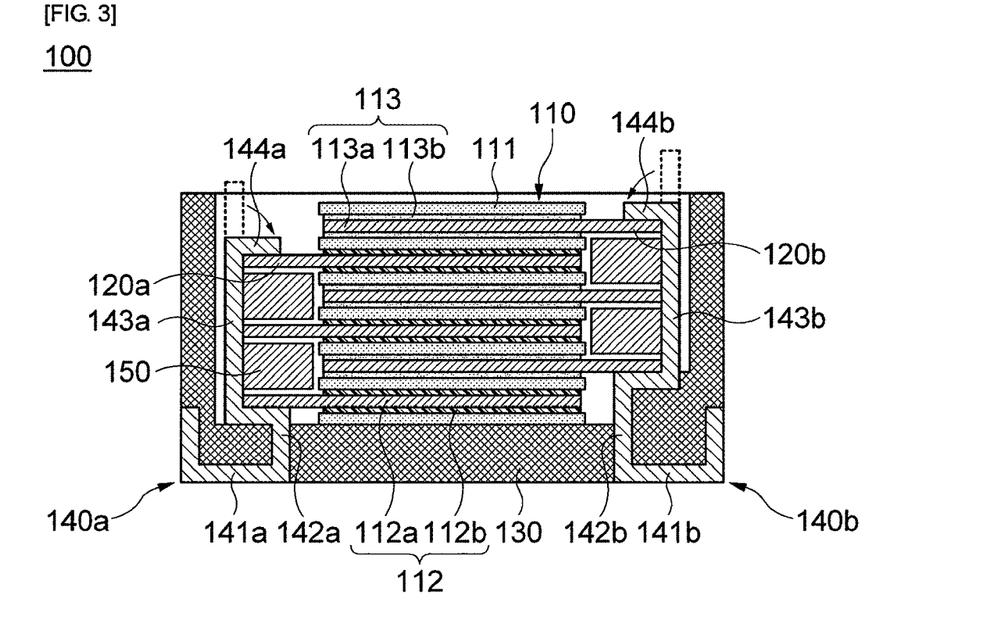
FIG. 3 is a cross-sectional view of an electrochemical capacitor in accordance with a second embodiment of the present invention.

FIG. 3 is a cross-sectional view of an electrochemical capacitor in accordance with a second embodiment of the present invention. Hereinafter, the same description of the second embodiment as that of the first embodiment will be omitted due to the identical technical construction, except that an electrochemical capacitor further include a reinforcing member.

Referring to FIG. 3, the electrochemical capacitor 100 in accordance with a second embodiment of the present invention may include cell electrode unit 110, the terminals 120, the housing 130, and the output terminal unit 140. The cell electrode unit 110 is provided with the cathodes 112, the anodes 113, and the separators 111, all of which are stacked in multiple layers. The terminals 120 are disposed on the opposite sides of the cell electrode unit 110, and are connected to each of the cathodes 112 and the anodes 113. The housing 130 receives the cell electrode unit 110 and the terminals 120. The output terminal unit 140 is insert-molded in such a manner to penetrate from the inside of the housing 130 to the outside thereof, and are electrically connected to the each of the terminals 120. The output terminal unit 140 can immobilize the cell electrode unit 110 into the housing.

Herein, the terminals 120 may be provided with the cathode terminals 120a stacked one above another, and the anode terminals 120b stacked one above another. In this case, the stacked cathode terminals 120a may be extended in a horizontal direction to the cathode current collectors 112a, respectively. Thus, the stacked cathode terminals 120a may be spaced apart from one another at distance as large as a sum value obtained by thicknesses of at least two separators, anode, and at least two cathode active material layers. That is, the stacked cathode terminals 120a may be disposed with a separation space from one another.

Thus, in case where the cell electrode unit 110 is provided in the housing 130, and then the first fixing part 144a of the cell electrode unit 110 is bent to cover the uppermost one of cathode terminals 120a, load applied to bend the first fixing part 144a results in downward warpage or break-off of the stacked cathode terminals 120a. In this case, the stacked anode terminals 120b may be disposed to be spaced apart from one another, so when the second fixing part 144b is bent, the stacked anode terminals 120b are downwardly bent or cut-off.

Thus, each of reinforcing members 150 may be interposed between the stacked cathode terminals 120a, and between the stacked anode terminals 120b. In this case, the reinforcing members 150 can prevent the stacked cathode terminals 120a and anode terminals 120b from being downwardly deformed due to the applied load when the first and second fixing parts 144a and 144b are bent.

The reinforcing members 150 may be formed of the same material as either that of the separator, or of the elastic resin, but the materials of the reinforcing members are not limited by the embodiment of the present invention.

Therefore, as in the embodiment of the present invention, by interposing the each of the reinforcing members 150 between the stacked terminals, it is possible to prevent the terminals from being deformed or cut-off while the output terminal unit 140 is bent.

Figure 4:
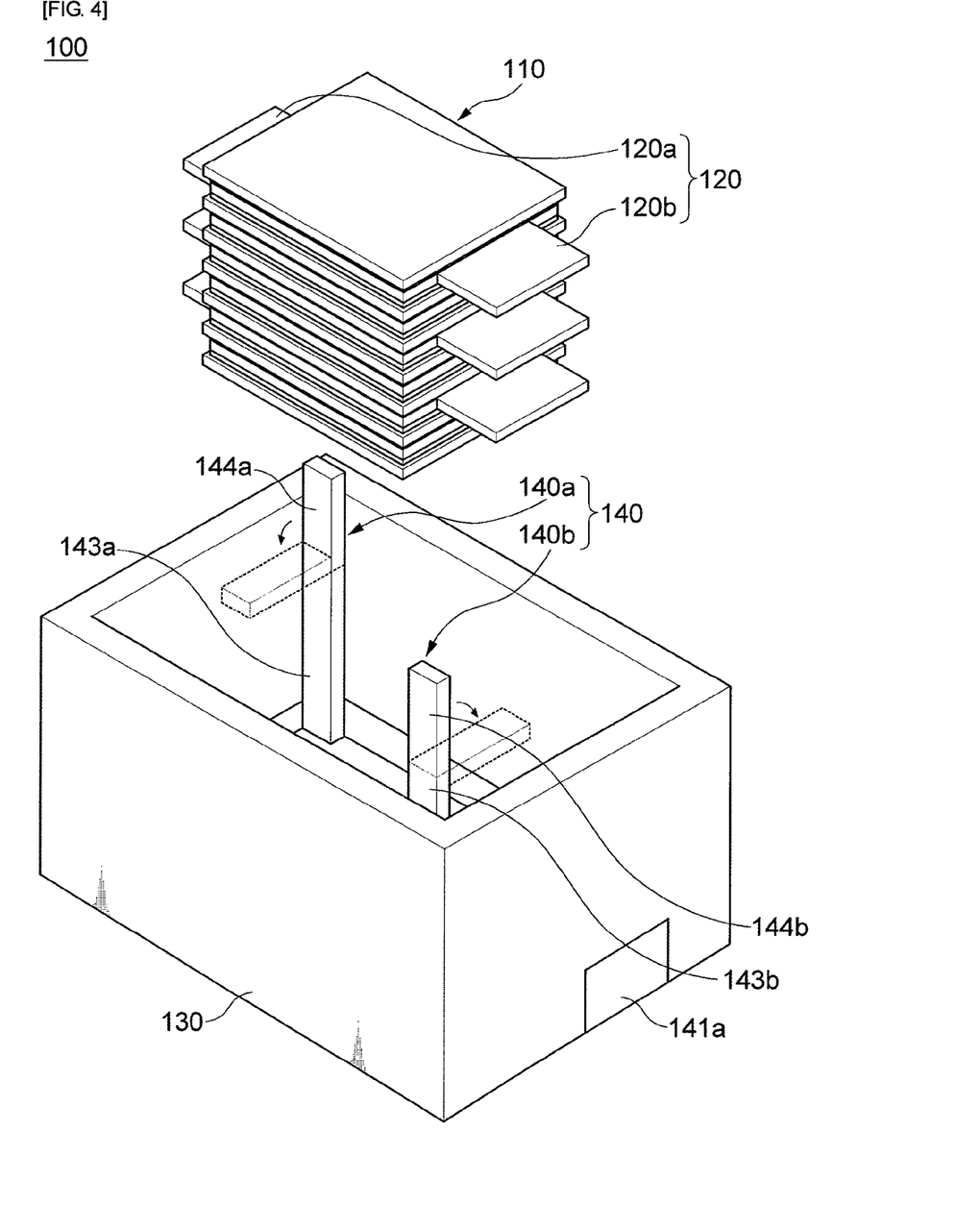
FIG. 4 is an exploded perspective view of an electrochemical capacitor in accordance with a third embodiment of the present invention.

FIG. 4 is an exploded perspective view of an electrochemical capacitor in accordance with a third embodiment of the present invention.

Figure 5:
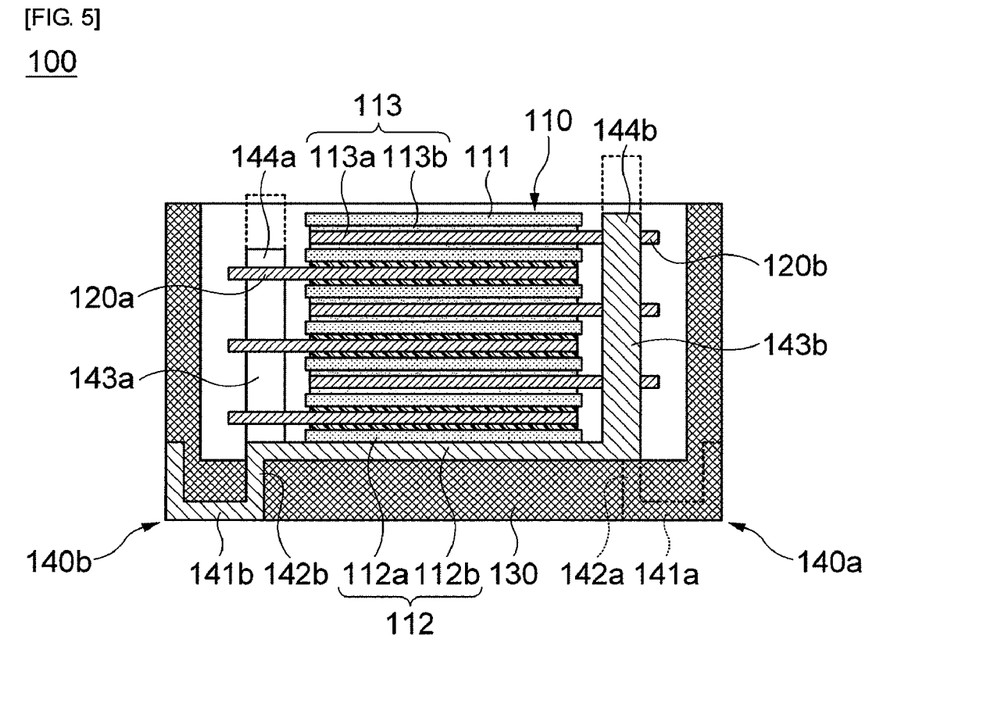
FIG. 5 is a cross-sectional view of the electrochemical capacitor shown in FIG. 4.

FIG. 5 is a cross-sectional view of the electrochemical capacitor shown in FIG. 4.

Herein, description will merely be given of technical construction for the second output terminal unit 140b differentiated from the first output terminal unit 140a, and the repeated description thereof will be omitted.

Referring to FIGS. 4 and 5, the electrochemical capacitor 100 of the third embodiment of the present invention may include the cell electrode unit 110, the terminals 120, the housing 130, and the output terminal unit 140. The cell electrode unit 110 is provided with the cathodes 112, the anodes 113, and the separators 111, all of which are sequentially stacked in multiple layers. The terminals 120 are disposed on the opposite ends of the cell electrode unit 110, and are connected to the cathodes 112 and the anodes 113, respectively. The housing 130 receives the cell electrode unit 110 and the terminals 120. The output terminal unit 140 is insert-molded to penetrate from the inside to the outside of the housing 130, and is electrically connected to the respective terminals 120. In addition, the output terminal unit 140 can immobilize the cell electrode unit 110 in the housing 130.

Herein, the output terminal unit 140 may include the first output terminal unit 140a connected to the cathode terminals 120a, and the second output terminal unit 140b connected to the anode terminals 120b. Herein, in case where the cathode terminals 120a and the anode terminals 120b may be disposed on each of the right and left sides of the housing 130 in such a manner so that the cathode and anode terminals can face each other, the first output terminal unit 140a and the second output terminal unit 140b may be disposed on each of the top and bottom sides of the housing 130.

Herein, the first output terminal unit 140a may include the first external contact part 141a, the first insertion part 142a, the first internal contact part 143a, and the first fixing part 144a, all of which are integrally interconnected to one another. In this case, the first internal contact part 143a may be formed along the side ends of the stacked cathode terminals 120a. Herein, the side ends of the cathode terminals 120a may be formed to be bent from ends of the cathodes to the outside. That is, the side ends of the cathode terminals 120a are connected to the ends of the cathodes 112.

Also, the second output terminal unit 140b may include the second external contact part 141b, the second insertion part 142b, the second internal contact part 143b, and the second fixing part 144b, all of which are integrally connected to one another. In this case, the second internal contact part 143b may be formed along the side ends of the stacked anode terminals 120b. Herein, the side end of the anode terminals 120b may be formed to be bent from ends of the anodes 113 to the outside. That is, the side ends of the anode terminals 120b are connected to the ends of the anodes 113.

In addition, although not sown in the drawings, each of the reinforcing members 150 is further provided between the stacked cathode terminals 120a, and between the stacked anode terminals 120b, so that it is possible to prevent the cathode terminals 120a and the anode terminals 120b from being deformed or break-down due to the load resulting from warpage of the first and second fixing parts 144a and 144b.

Therefore, as in the embodiment of the present invention, the electrochemical capacitor 100 is provided with the output terminal unit 140 in the inside of the housing in an insert-molding scheme. By using the output terminal unit 140, it is possible to achieve electrical interconnection of the side ends of the stacked terminals which are spaced apart from one another. As a result, the electrochemical capacitor 100 of the present invention requires no separate fusion process, so it is possible to reduce the rate of defective processes and the number of the processes.

Figure 6:
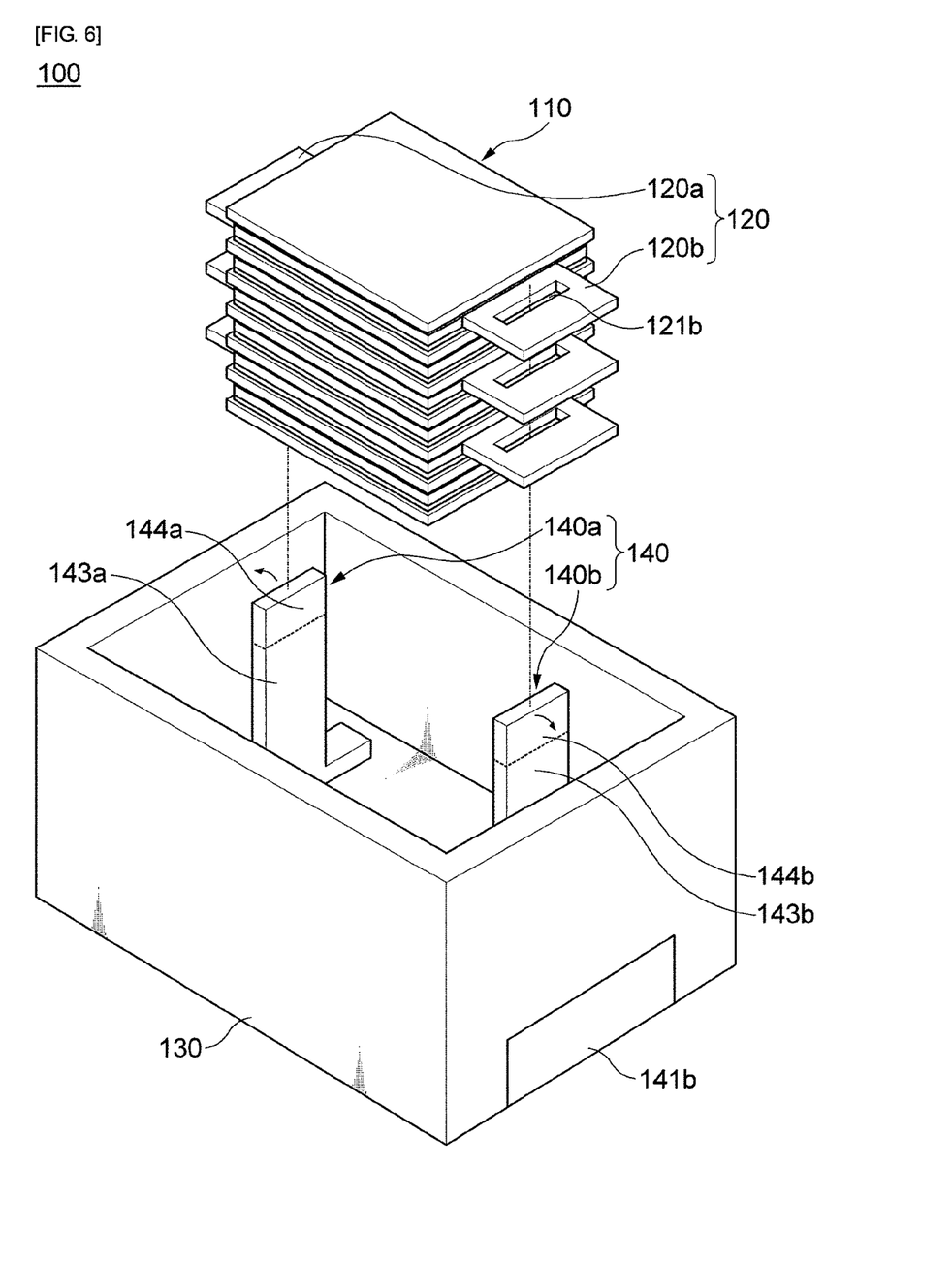
FIG. 6 is an exploded perspective view of the electrochemical capacitor in accordance with a fourth embodiment of the present invention.

FIG. 6 is an exploded perspective view of the electrochemical capacitor in accordance with a fourth embodiment of the present invention.

Figure 7:
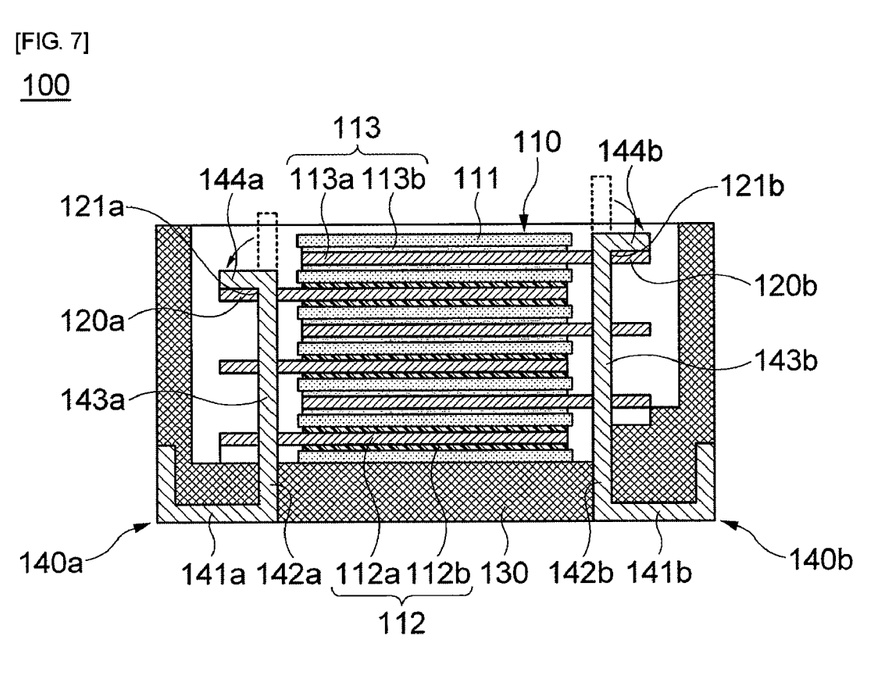
FIG. 7 is a cross-sectional view of the electrochemical capacitor shown in FIG. 6.

FIG. 7 is a cross-sectional view of the electrochemical capacitor shown in FIG. 6.

Herein, since the electrochemical capacitor of the fourth embodiment has the same technical construction as that of the first embodiment except for the shapes of terminals, the repeated description thereof will be omitted.

Referring to FIGS. 6 and 7, the electrochemical capacitor 100 of the third embodiment of the present invention may include the cell electrode unit 110, the terminals 120, the housing 130, and the output terminal unit 140. The cell electrode unit 110 is provided with the cathodes 112, the anodes 113, and the separators 111, all of which are sequentially stacked in multiple layers. The terminals 120 are disposed on the opposite ends of the cell electrode unit 110, and are connected to the cathodes 112 and the anodes 113, respectively. The housing 130 receives the cell electrode unit 110 and the terminals 120. The output terminal unit 140 is insert-molded to penetrate from the inside to the outside of the housing 130, and is electrically connected to each of the terminals 120. The output terminal unit 140 immobilizes the cell electrode unit 110 in the housing 130.

The output terminal unit 140 may include the first output terminal unit 140a and the second output terminal unit 140b, each of which is electrically connected to the cathode terminals 120a and the anode terminals 120b.

The stacked terminals 120 may include the cathode terminals 120a and the anode terminals 120b. Herein, the stacked cathode terminals 120a have cathode insertion holes 121a through which they are interconnected to one another. In this case, the first internal contact part 143a of the first output terminal unit 140a pass through the cathode insertion holes 121a to be in contact with each other, so that the first output terminal unit 140a may be electrically connected to the stacked cathode terminals 120a.

Also, the stacked anode terminals 120b have anode insertion holes 121b through which they are interconnected to one another. The second internal contact part 143b of the second output terminal unit 140b passes through the anode insertion holes 121b to be in contact with each other, so that the stacked anode terminals 120b may be electrically connected to the second output terminal unit 140b.

In this case, in order to form the cell electrode unit 110, in case where the cathodes 112 and the anodes 113 are sequentially with respect to the separators 111 interposed therebetween, the first internal contact part 143a and the second internal contact part 143b are inserted into the cathode insertion holes 121a and the anode insertion holes 121b, respectively, so that the cathodes 112 and the anodes 113 are sequentially stacked one above another. Thus, it is possible to easily perform a laminate process of the cathodes 112 and the anodes 113 even without a separate align process.

Also, the first internal contact part 143a and the second internal contact part 143b are fixedly inserted into the cathode insertion holes 121a and the anode insertion holes 121b, so that the cathodes 112 and the anodes 113 can be more effectively fixed at the housing 130 by means of the first output terminal unit 140a and the second output terminal unit 140b.

In addition, although not shown in the drawings, each of the reinforcing members 150 are further provided between the stacked cathode terminals 120a, and between the stacked anode terminals 120b, so that it is possible to prevent the cathode terminals 120a and the anode terminals 120b from being downwardly bent and deformed due to the load resulting from warpage of the first fixing part 144a and the second fixing part 144b.

The electrochemical capacitor of the present invention is provided with the output terminal unit 140 in such a manner to penetrate from the inside to the outside of the housing in an insertion molding scheme, so that the each of terminals directly contacts the output terminal unit 140, which results in a decrease in the rate of defective processes and the number of the processes.

The electrochemical capacitor of the present invention requires no fusion process, so that it is possible to directly perform a process of stacking the cathodes, separators, and anodes in the inside of the housing even without a separate align process, which causes mass-production.

The electrochemical capacitor of the present invention can immobilize the cell electrode unit stacked with multiple layers into the housing by the output terminal unit, so that it is possible to ensure durability against the external shock.

As described above, although the preferable embodiments of the present invention have been shown and described, it will be appreciated by those skilled in the art that substitutions, modifications and variations may be made in these embodiments without departing from the principles and spirit of the general inventive concept, the scope of which is defined in the appended claims and their equivalents.

What is claimed is:
1. An electrochemical capacitor comprising:
a cell electrode unit which includes cathodes, anodes, and separators interposed between the cathodes and the anodes which are alternately stacked in multiple layers;
cathode terminals which are extended to one side of each of the cathodes and are stacked one above another;
anode terminals which are extended to one side of each of the anodes and are stacked one above another with a separation space from the cathode terminals;
a housing for receiving the cell electrode unit, the cathode terminals, and the anode terminals; and
an output terminal unit which is insert-molded to penetrate from the inside to the outside of the housing, electrically connected to at least one of each of the stacked cathode and anode terminals, and immobilizes the cell electrode unit into the housing.

2. The electrochemical capacitor of claim 1, wherein the output terminal unit comprises:
- external contact parts which are disposed on external surfaces of the housing;
- insertion parts which are extended from the external contact parts and inserted into the housing; and
- internal contact parts which are extended from the insertion parts and are in contact with each of the stacked terminals.

3. The electrochemical capacitor of claim 2, wherein each of the internal contact parts electrically connects ends of the stacked terminals facing ends of the cathodes, or ends of the anodes.

4. The electrochemical capacitor of claim 2, wherein each of the internal contact parts electrically connects side ends of the stacked terminals connected to the ends of the cathodes, or the ends of the anodes.

5. The electrochemical capacitor of claim 2, wherein each of the terminals includes insertion holes through which the internal contact parts are inserted to interconnect the stacked terminals.

6. The electrochemical capacitor of claim 2, wherein the external contact parts are disposed on at least one of bottom and side surfaces of the housing.

7. The electrochemical capacitor of claim 2, wherein the output terminal unit further comprises fixing parts which are extended from the internal contact parts, and are bent to immobilize the cell electrode unit in the housing.

8. The electrochemical capacitor of claim 7, wherein each of the fixing parts is bent to cover the uppermost anode terminal of the stacked anode terminals, or the uppermost cathode terminal of the cathode terminals.

9. The electrochemical capacitor of claim 1, wherein each of the terminals is extended in a horizontal direction to the cathodes, or to the anodes.

10. The electrochemical capacitor of claim 1, further comprising reinforcing members interposed between respective stacked terminals.

* * * * *